United States Patent [19]
Crawley

[11] 3,823,531
[45] July 16, 1974

[54] GAS CLEANER

[76] Inventor: James A. Crawley, 925 N. 26th Ave., Hollywood, Fla. 33020

[22] Filed: Aug. 15, 1972

[21] Appl. No.: 280,826

[52] U.S. Cl............... 55/233, 55/228, 55/261, 55/481, 261/17, 261/105
[51] Int. Cl............................................ B01d 47/06
[58] Field of Search ............. 55/220, 222, 228, 229, 55/233, 261, 265, 310, 311, 478, 481, 235, 237, 238; 261/17, 105, 106

[56] References Cited
UNITED STATES PATENTS

| | | | |
|---|---|---|---|
| 1,279,895 | 9/1918 | Minton | 55/233 UX |
| 1,788,306 | 1/1931 | Kline | 55/233 UX |
| 1,794,908 | 3/1931 | Kreft | 55/481 X |
| 1,918,531 | 7/1933 | Gentry | 55/234 |
| 2,057,579 | 10/1936 | Kurth | 55/228 X |
| 2,095,539 | 10/1937 | Bichowsky | 55/233 X |
| 2,646,263 | 7/1953 | Goldberg | 55/233 UX |
| 2,878,107 | 3/1959 | Ruth | 55/233 UX |
| 2,932,157 | 4/1960 | Villasenoretol | 35/261 X |
| 3,353,799 | 11/1967 | Lions et al. | 55/228 X |
| 3,453,447 | 11/1948 | McKeown | 55/233 |
| 3,462,919 | 8/1969 | Zalman | 55/261 X |
| 3,572,264 | 3/1971 | Mercer | 55/228 UX |
| 3,626,672 | 12/1971 | Burbidge | 55/238 X |
| 3,753,337 | 8/1973 | Shaw | 55/233 |
| 3,756,171 | 9/1973 | Debord | 55/228 X |

Primary Examiner—Frank W. Lutter
Assistant Examiner—Vincent Gifford
Attorney, Agent, or Firm—Oltman and Flynn

[57] ABSTRACT

Apparatus for cleaning and quenching a hot gas stream contaminated with solids. The apparatus includes a gas flow duct, a plurality of porous filter elements arranged in series along the duct between a gas inlet and a gas outlet, and a plurality of liquid discharge heads in the duct for respectively discharging a washing liquid onto each of the filter elements for removal of solids from the gas in passing through the filter elements. A suction blower draws gas contaminated with solids through the duct and the filter elements and forces the gas out through the gas outlet. The gas washing liquid drains to an external filter and is collected and pumped back to the discharge heads for recirculating the washing liquid. A plurality of inlets are provided in the duct for supplying environmental air into the duct by suction of the blower so that the air can be cleaned by passage through the filter elements.

3 Claims, 9 Drawing Figures

PATENTED JUL 16 1974

GAS CLEANER

BACKGROUND OF THE INVENTION

Recently, a great deal of attention has been paid to environmental problems, and in particular, contamination of the atmosphere. Gases discharged from factories into the atmosphere are often contaminated with solids which pollute the atmosphere. Although gas cleaning apparatus is known, it is believed that there has been a need for improvement of such apparatus. A particular objective of the present invention is to provide gas cleaning apparatus which not only cleans contaminated gas discharged from an artificial source, but also cleans environmental air at the same time. This objective is accomplished by the use of gas-liquid contact in a system in which liquid is recirculated.

SUMMARY OF THE INVENTION

In accordance with the present invention, the gas cleaner includes a gas duct in which filter elements are arranged in series and in which liquid is discharged onto the filter elements for the purpose of contacting and cleaning contaminated gas which passes through the filter elements. The contaminated gas is drawn through the filter elements by a blower which is located adjacent the discharge end of the gas duct. The blower not only sucks contaminated gas from an artificial source through the filter elements, but also sucks environmental air into the gas duct through special inlets, so that the environmental air passes through the filter elements along with the contaminated gas. The washing liquid drains from the gas duct to an external filter where it is cleaned, and the liquid is then pumped back to discharge heads provided in the gas duct where it is again sprayed onto the filter elements.

Accordingly, it is an object of the present invention to provide improved apparatus for cleaning contaminated gas and environmental air at the same time.

Another object of the invention is to provide apparatus for cleaning contaminated gas by gas-liquid contact employing recirculation of washing liquid.

Another object of the invention is to provide gas cleaning apparatus in which filter elements are removable for cleaning.

A further object of the invention is to clean washing liquid before recirculating it through the apparatus.

Another object of the invention is to provide gas cleaning apparatus in which the cleaning duct may provide either a horizontal flow path or a vertical flow path for contaminated gases.

Other objects of this invention will appear from the following description and appended claims, reference being had to the accompanying drawings forming a part of this specification wherein like reference characters designate corresponding parts in the several views.

Figure 1:
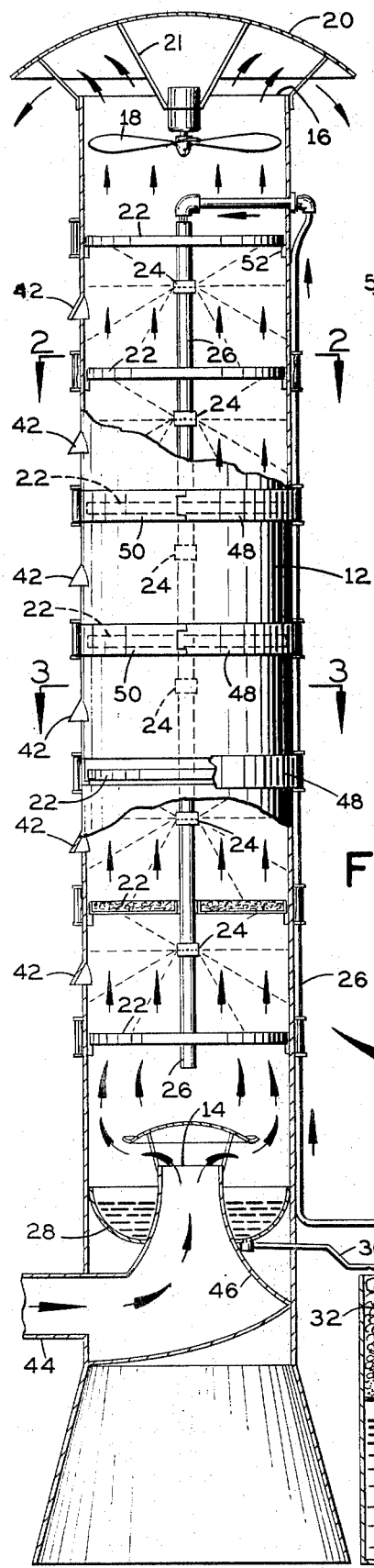
FIG. 1 is a vertical sectional view of a gas cleaning apparatus in accordance with one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The apparatus 10 of FIGS. 1 through 4 includes a gas cleaning duct 12 which in this embodiment provides a vertical flow path for the contaminated gas. The duct 12 has a gas inlet 14 leading into it through which contaminated gas is supplied into the duct. The duct also has a gas outlet 16 through which the cleaned gas leaves the duct.

Mounted adjacent the gas outlet 16 is a blower 18 for drawing the contaminated gas into the duct through the inlet 14 and for forcing the cleaned gas out of the outlet 16. In this embodiment, the blower is suspended from a deflector 20 which is mounted on struts 22 attached to the upper end of the duct 12. The deflector 20 serves to discharge gas to the atmosphere without allowing rain or other objects to enter the duct 12.

Porous filter elements 22 are spaced serially along the length of the duct 12 so that the contaminated gas flows through the filter elements in series. The filter elements 22 extend transversely across the duct 12.

Liquid discharge heads 24 are provided in the duct, with one discharge head 24 being located between each adjacent pair of filter elements. The discharge heads 24 serve to spray washing liquid onto the filter elements 22. A liquid washing agent, such as water, is supplied to the discharge heads 24 through a pipe 26 which leads up the outside of the duct 12 and then passes downward through the center of the duct 12. The washing liquid drains downwardly through the filter elements to a collector 28 at the bottom of duct 12 where the washing liquid temporarily collects. The collected liquid is drained via a pipe 30 to an external sand and gravel filter 32. The washing liquid contacts the contaminated gas around and in the filter elements 22 and removes solids from those gases. The dirty washing liquid is filtered in the filter unit 32 to remove solids from it. The cleaned liquid collects in a reservoir 34, and it is pumped back to the discharge heads 24 by a pump 36 having its intake 38 in the reservoir 34 and its outlet 40 connected to pipe 26. Thus, the washing liquid is continuously recirculated by recirculating means which includes the pipes 26 and 30, the filter 32, the reservoir 34 and the pump 36.

The duct 12 has special inlets 42 leading into it between each adjacent pair of filter elements, each of the environmental air inlets is located along the duct at the gas inlet side of the spray head that is located between the same successive filter elements. The inlets 42 communicate with the environmental atmosphere around the duct 12, and the blower 18 sucks air from the environment into the duct 12 where it passes through the filter elements 22 along with the contaminated gases and is cleaned by the washing liquid. The cleaned air is discharged along with the other cleaned gases. Thus, the invention provides cleaning of environmental air as well as cleaning of contaminated gases from an artificial source.

The gases which are contaminated with solids are supplied from the artificial source, such as a furnace, through a conduit 44 which leads through a mouth 46 to the gas inlet 14.

Figure 2:
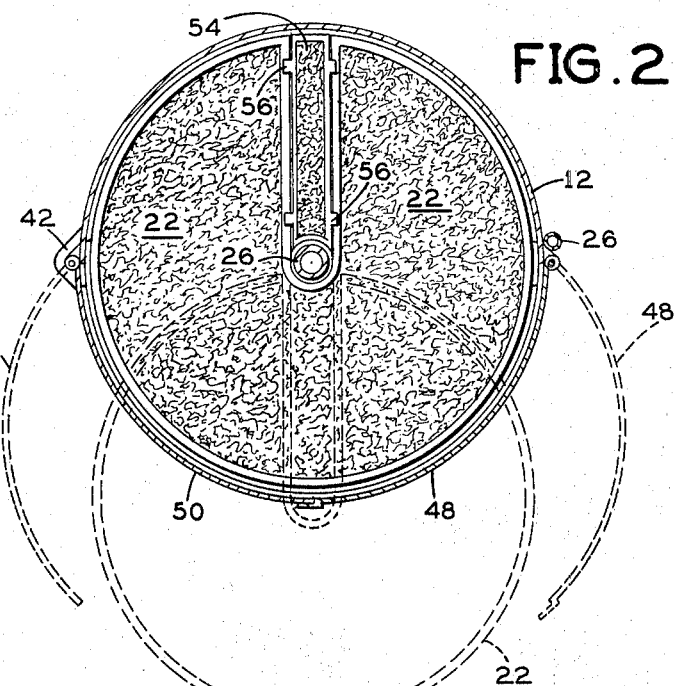
FIG. 2 is a sectional view taken along line 2—2 of FIG. 1 and looking in the direction of the arrows.

The gas duct 12 has a plurality of pairs of doors 48, 50 next to each filter element 22 through which the filter element may be inserted into the duct 12 in the manner shown in FIG. 2. In FIG. 2, the filter element 22 is shown in dashed lines as it is entering the duct 12 and is shown in solid lines in its position inside the duct. The filter elements are mounted on suitable supports 52.

Figure 4:
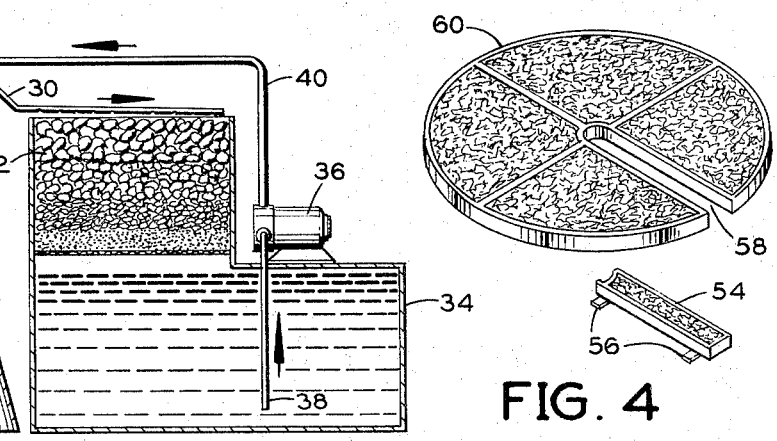
FIG. 4 is an exploded perspective view showing parts of a filter element included in the apparatus of FIG. 1.

Each filter element 22 includes a removable section 54 having tabs such as 56 for mounting it on the main portion of the filter element. When the section 54 is removed from the remainder of the filter element, a slot 58 is formed in the filter element as shown in FIG. 4. The slot receives the pipe 26 at the center of the gas duct. After the filter element is in place with the pipe at the middle of the filter element, the section 54 is placed in the slot 58.

Figure 3:
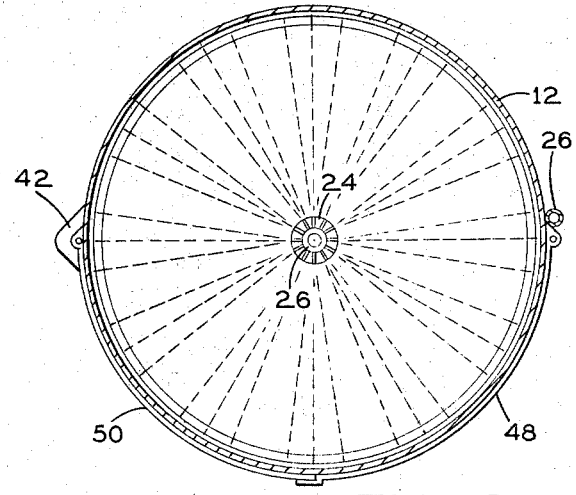
FIG. 3 is a sectional view taken along line 3—3 of FIG. 1 and looking in the direction of the arrows.

The discharge heads 24 spray washing liquid onto the filter elements, as previously mentioned, and the spray is distributed throughout the cross section of the gas duct as illustrated in FIG. 3. Thus, the contaminated gas and environmental air contacts the spray adjacent to the filter elements and also contacts the liquid within the filter elements. The filter elements may be made of fibrous material mounted on a suitable frame 60.

Figure 6:
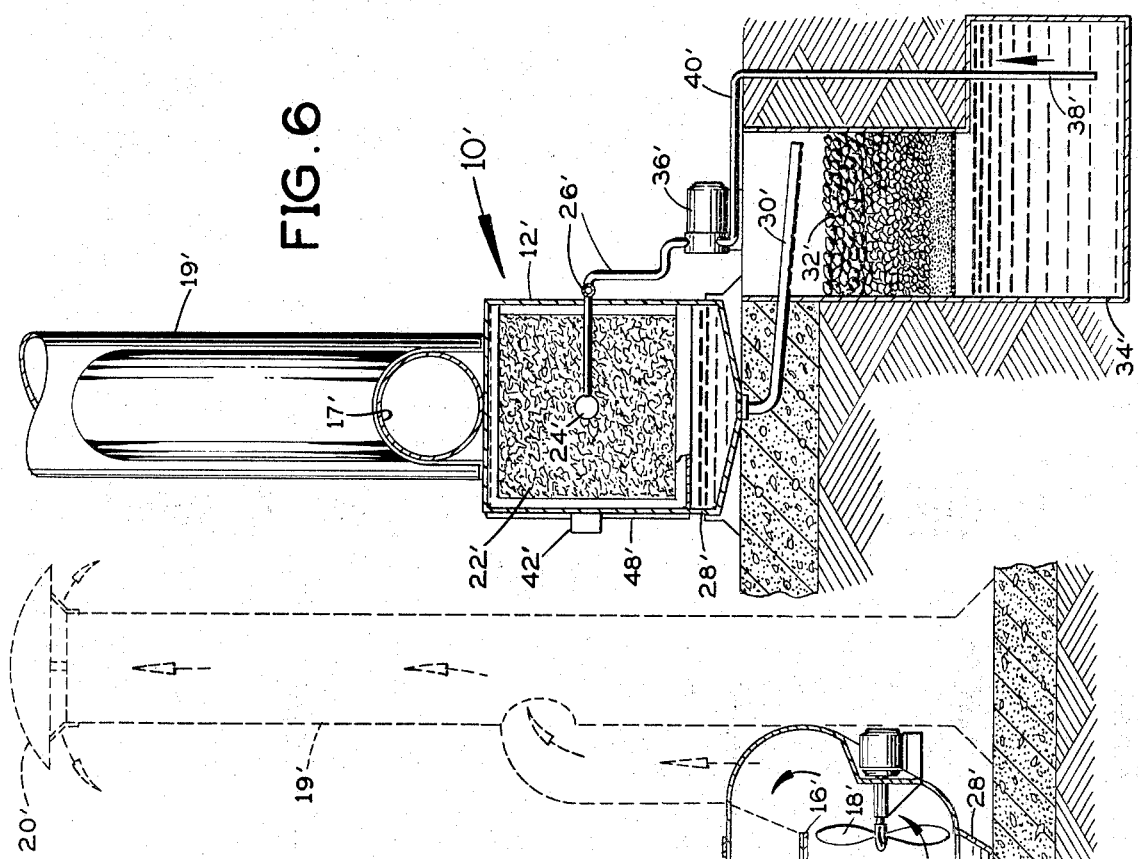
FIG. 6 is a sectional view taken along line 6—6 of FIG. 5 and looking in the direction of the arrows.
Figure 5:
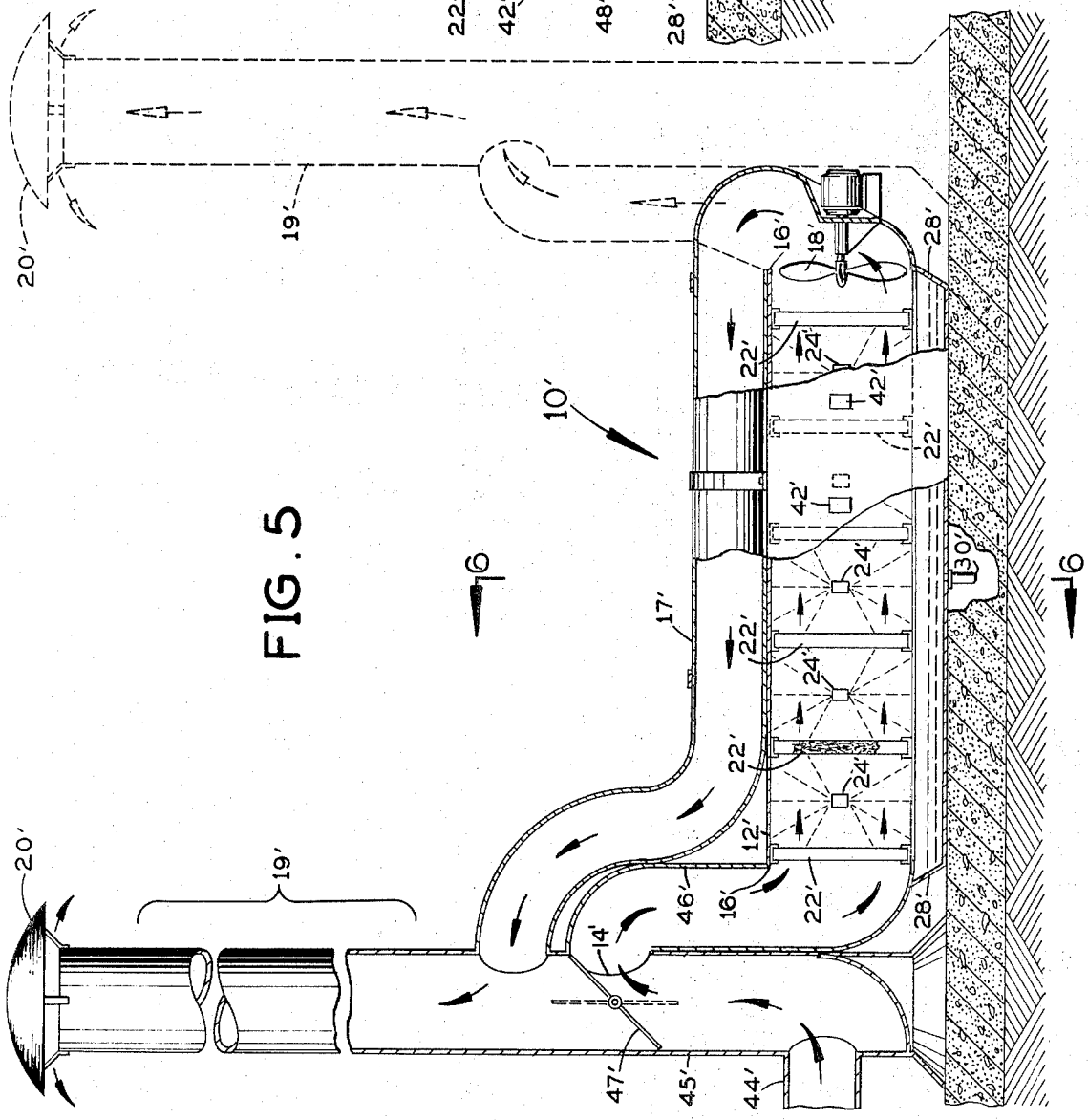
FIG. 5 is a vertical sectional view of a gas cleaning apparatus in accordance with another embodiment of the invention.

FIGS. 5 and 6 illustrate another embodiment of the invention in which like parts have the same reference numerals except that a prime designation has been added to differentiate the embodiments. In this embodiment, the gas duct 12' is substantially the same as previously described except that it is in a horizontal position to provide a horizontal path for flow of the contaminated gases and environmental air. The duct 12' has a gas inlet 14' and a gas outlet 16', and the blower 18' is mounted adjacent the outlet 16' for drawing contaminated gases and environmental air through the duct 12'. The environmental air is admitted through the special inlets 42'.

The contaminated gases containing solids are supplied from an artificial source through a conduit 44' which leads through the lower portion 45' of a smokestack and a conduit 46' to the gas inlet 14'. The gas is deflected by a baffle 47'. A conduit 17' leads from the gas outlet 16' to the upper portion 19' of the smokestack which is covered by the deflector 20'. Thus, in this embodiment the conduit 17', the upper stack portion 19' and the deflector 20' constitute the discharge means for discharging cleaned air and gases to the environment.

The collector 28' receives dirty washing liquid from the filter elements 22'. As shown in FIG. 6, the dirty liquid is drained through pipe 30' to the external filter 32' which cleans the washing liquid. The liquid returns to the reservoir 34', and is pumped by the pump 36' via pipe 26' to the discharge heads 24'.

An advantage of the embodiment of FIGS. 5 and 6 is that the gas duct, being horizontal, provides easier access to the filter elements for cleaning purposes.

It will be noted that the smokestack 19' could be located at the opposite end of the gas duct 12' as shown in dashed lines in FIG. 5.

Figure 7:
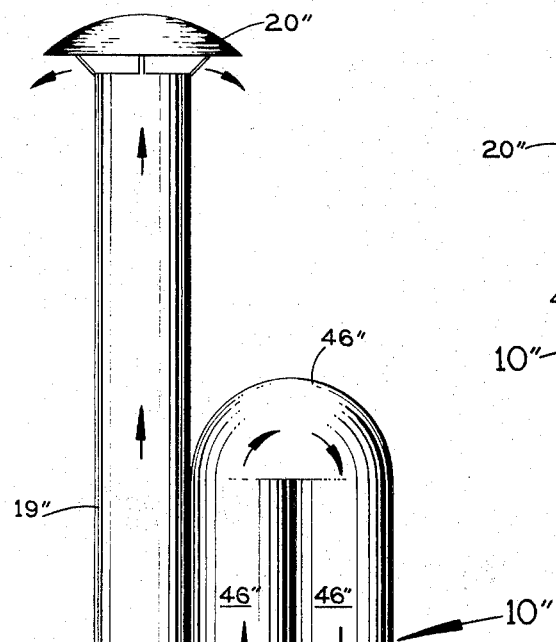
FIG. 7 is an elevational view of a third embodiment of the invention.
Figure 8:
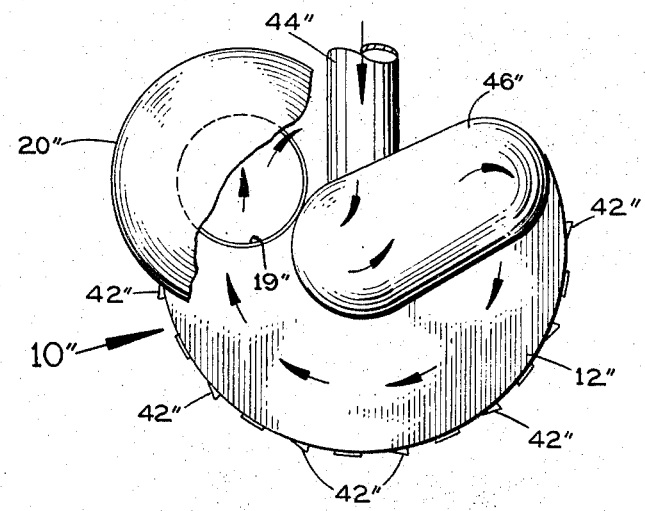
FIG. 8 is a plan view, partly in section, of the apparatus of FIG. 7.
Figure 9:
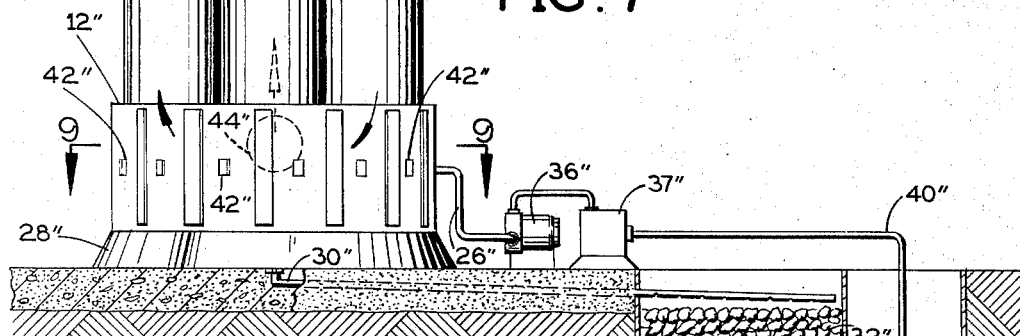
FIG. 9 is a horizontal sectional view taken along line 9—9 of FIG. 7 and looking in the direction of the arrows.
Figure 9:
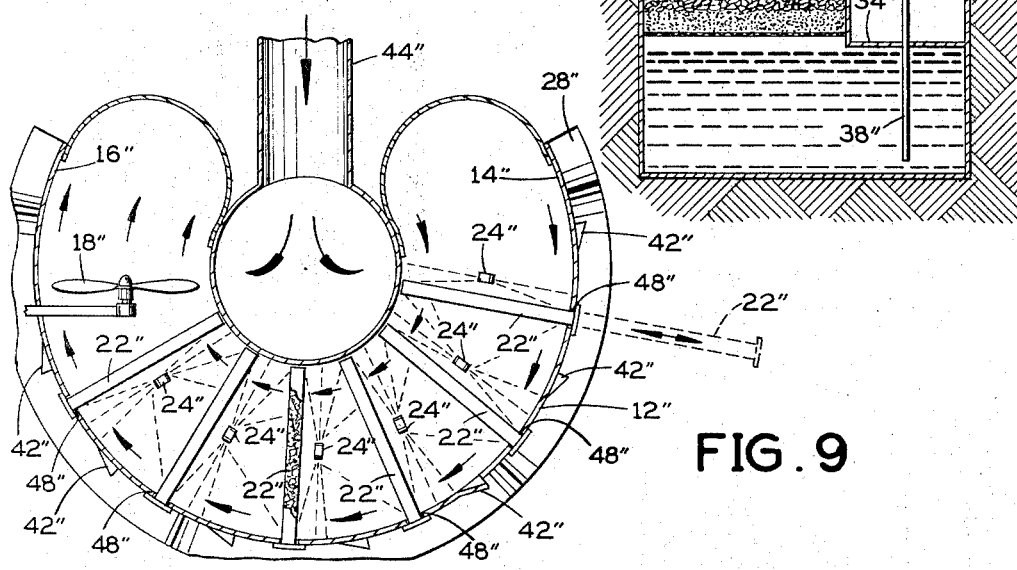

In the embodiment of FIGS. 7-9, the same reference numerals are used for like parts with the exception that a double prime designation has been added to differentiate this embodiment. The apparatus 10" is basically the same as that described in connection with FIGS. 1 and 5, the main difference being that the gas duct 12" is both horizontal and curved so as to provide a curved horizontal path for the contaminated gases. The gas duct 12" communicates at its inlet end 14" with a rebent conduit 46" which in turn communicates with the inlet conduit 44". The outlet end 16" of the gas duct 12" communicates with a stack 19" which has a deflector 20" mounted at the top end thereof. The stack 19" and the deflector 20" constitute the discharge means. The blower 18" is located adjacent to the discharge end 16". The blower again serves to draw contaminated gases through the duct 12" and through the filter elements 22" which extend transversely across the duct. The blower also serves to draw environmental air through the special inlets 42" through the filter elements.

Liquid drains to a collector 28" and returns via pipe 30" to the external filter 32" where it is cleaned by filtration. The liquid drains to a collector 34"', and is pumped by the pump 36" back to the discharge heads 24" via pipe 26". In this embodiment, a heat exchanger 37" is connected between the pump 36" and the reservoir 34". Heat can be withdrawn from the washing liquid in the heat exchanger 37" before it is recirculated to the discharge heads 24".

SUMMARY

Thus, the invention provides an improved apparatus for cleaning gases contaminated with solids and also cleaning environmental air. The apparatus employs contact between liquid and gases for cleaning purposes, and the washing liquid is recirculated to reduce liquid consumption. Make up liquid can be added to the system as needed.

Having thus described my invention, I claim:

1. Apparatus for cleaning and quenching a hot gas stream contaminated with solids comprising:

a gas flow duct having a gas inlet and a gas outlet through which the contaminated gas flows into and out of said duct, a plurality of porous filter elements arranged serially and spaced apart along said duct between said inlet and said outlet and each extending transversely across said duct, a plurality of liquid discharge heads in said duct located respectively between successive filter elements along the duct for respectively discharging a liquid washing agent transversely into the duct and onto each of said filter elements for removal of solids from the gas in passing through the duct and said filter elements, suction blower means mounted in said duct adjacent to said gas outlet for drawing contaminated gas into said inlet and through said duct and said filter elements and forcing the same out through said outlet, means communicating with said outlet to discharge cleaned gas to the atmosphere, means communicating with said inlet to supply the contaminated gas thereto, said duct having a plurality of environmental air inlets located respectively between successive filter elements along its length and at the gas inlet side of the spray head that is located between the same successive filter elements to pass ambient air from outside the duct into the gas stream drawn through the duct and through said filter elements by said blower means, washing liquid supply means connected to said discharge heads for supplying washing liquid thereto, washing liquid return means for returning washing liquid from said duct, washing liquid filter means connected to said return means for filtering the washing liquid to clean the same, a reservoir receiving the cleaned liquid from said filter means, pump means connected between said reservoir and said supply means for pumping washing liquid from said reservoir to said discharge means, a pipe extending centrally inside the duct and carrying said liquid discharge heads, and wherein each of said filter elements has a transverse slot extending inward from its periphery and slidable over said pipe for the insertion or removal of the filter element transversely of the duct, and a removable section of each filter element closing said slot when the filter element is in place in the duct.

2. The apparatus as claimed in claim 1 in which said duct includes door means for each of said filter elements providing access for insertion and removal of said filter elements relative to said duct.

3. Apparatus according to claim 1, wherein the duct extends substantially vertically up from said gas inlet to said gas outlet.

* * * * *